United States Patent
Perrone et al.

(10) Patent No.: US 6,320,985 B1
(45) Date of Patent: Nov. 20, 2001

(54) APPARATUS AND METHOD FOR AUGMENTING DATA IN HANDWRITING RECOGNITION SYSTEM

(75) Inventors: Michael P. Perrone, Yorktown; Jayashree Subrahmonia, White Plains, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/126,893

(22) Filed: Jul. 31, 1998

(51) Int. Cl.[7] .............................. G06K 9/00; G06K 9/18; G06K 9/62
(52) U.S. Cl. .................... 382/224; 382/159; 382/181; 382/186; 382/187
(58) Field of Search ................................. 382/181, 186, 382/187, 224, 226, 227, 228, 159, 160

(56) References Cited

U.S. PATENT DOCUMENTS

| | | | |
|---|---|---|---|
| 5,005,205 | * 4/1991 | Ellozy et al. | 382/187 |
| 5,058,182 | * 10/1991 | Kuan et al. | 382/224 |
| 5,333,209 | * 7/1994 | Sinden et al. | 382/187 |
| 5,434,929 | 7/1995 | Beernink et al. | 382/253 |
| 5,454,046 | * 9/1995 | Carman, II | 382/186 |
| 5,479,523 | * 12/1995 | Gaborski et al. | 382/224 |
| 5,559,897 | * 9/1996 | Brown et al. | 382/186 |
| 5,559,925 | 9/1996 | Austin | 704/231 |
| 5,577,135 | * 11/1996 | Grajski et al. | 382/253 |
| 5,617,486 | 4/1997 | Chow et al. | 382/181 |
| 5,642,435 | * 6/1997 | Loris | 382/224 |
| 5,644,652 | * 7/1997 | Bellegarda et al. | 382/186 |
| 5,666,438 | 9/1997 | Beernink et al. | 382/189 |
| 5,675,665 | 10/1997 | Lyon | 382/229 |
| 5,680,480 | 10/1997 | Beernink et al. | 382/187 |
| 5,680,510 | 10/1997 | Hon et al. | 704/255 |
| 5,689,584 | * 11/1997 | Kobayashi | 382/224 |
| 5,710,831 | 1/1998 | Beernink et al. | 382/189 |
| 5,737,487 | * 4/1998 | Bellegarda et al. | 704/250 |
| 5,737,490 | 4/1998 | Austin et al. | 704/246 |
| 5,757,964 | 5/1998 | Lee et al. | 382/229 |
| 5,761,687 | 6/1998 | Hon et al. | 707/531 |
| 5,768,422 | 6/1998 | Yaeger | 382/228 |
| 5,796,863 | 8/1998 | Lyon | 382/157 |
| 5,805,730 | 9/1998 | Yaeger et al. | 382/228 |
| 5,805,731 | 9/1998 | Yaeger et al. | 382/228 |
| 5,828,999 | 10/1998 | Bellegarda et al. | 704/240 |
| 5,852,801 | 12/1998 | Hon et al. | 704/244 |
| 5,903,884 | 5/1999 | Lyon et al. | 706/25 |
| 5,940,535 | * 8/1999 | Huang | 382/224 |
| 5,946,410 | 8/1999 | Lyon | 382/157 |
| 6,052,481 | 4/2000 | Grajski et al. | 382/187 |

OTHER PUBLICATIONS

Exhibit A of Supplemental Declaration of Michael Perrone, dated Aug. 25, 2000, program code for traugdat. c.
Declaration of Michael P. Perrone.

* cited by examiner

Primary Examiner—Leo Boudreau
Assistant Examiner—Daniel G. Mariam
(74) Attorney, Agent, or Firm—F. Chau & Associates, LLP

(57) ABSTRACT

An apparatus and method for providing improved data classification and, in particular, an apparatus and method for improved handwriting data recognition which enables handwriting recognition devices to robustly handle and recover from the problems associated with the omission of characters from collected handwriting samples. In one aspect, a data classification apparatus comprises: means for inputting a plurality of data, the plurality of data including one of data to be recognized, generic data and user-specific data; means for augmenting the user-specific data with the generic data to generate augmented user-specific data; means for training the data classification apparatus with the augmented user-specific data to generate training data; and means for recognizing the data to be recognized in accordance with the training data.

26 Claims, 2 Drawing Sheets

APPARATUS AND METHOD FOR AUGMENTING DATA IN HANDWRITING RECOGNITION SYSTEM

BACKGROUND

1. Technical Field

The present application relates generally to data classification and, more particularly, to an apparatus and method for improving recognition accuracy in handwritten text recognition systems by augmenting character data of collected handwriting samples.

2. Description of the Related Art

Currently, the need for accurate machine recognition of handwritten text has increased due to the popularity and wide spread use of handheld, pen-based computers. However, achieving high accuracy for handwriting recognition in conventional devices has proven to be a difficult task due to the wide variety of handwriting styles, many of which have ambiguous and/or conflicting character representations. In order to combat this problem, various techniques have been developed to enable handwriting recognition devices to adapt to an individual's writing style. These conventional methods can generally be divided into two categories: methods which require the collection of handwriting samples from each person; and methods which do not require such samples.

Typically, the conventional recognition systems which utilize handwriting samples are preferably used due to their superior recognition performance. However, one inherent problem with collecting these handwriting samples is that it is typically a tedious and burdensome process for the writer. In order to mitigate this burden and encourage the collection of the required samples, the collection process can be made easier by making the amount of required writing samples as small as reasonably possible. Reducing the amount of required writing samples, however, leads to another problem: the probability increases that samples of individual characters will be omitted. Consequently, when characters are omitted from the collected handwriting samples, the ability to achieve accurate handwriting recognition diminishes.

SUMMARY

The present application is generally directed to an apparatus and method for providing improved data classification and, in particular, to an apparatus and method for improved handwriting data classification which enables handwriting recognition devices to robustly handle and recover from the problems associated with the omission of characters from collected handwriting samples.

In one aspect, a data classification apparatus comprises:

means for inputting a plurality of data, the plurality of data including one of data to be recognized, generic data and user-specific data;

means for augmenting the user-specific data with the generic data to generate augmented user-specific data;

means for training the data classification apparatus with the augmented user-specific data to generate training data; and means for recognizing the data to be recognized in accordance with the training data.

In another aspect, in a data classification apparatus having means for inputting a plurality of data, the plurality of data including at least one of data to be recognized and user-specific data, the apparatus further having means for generating training data from the user-specific data, and means for recognizing the data to be recognized with the training data, a method for augmenting the user-specific data to improve classification accuracy of the apparatus, comprising the steps of:

collecting a plurality of generic user data;

computing threshold data in accordance with the collected plurality of generic user data;

augmenting the user-specific data with the generic user data in accordance with the computed threshold data, whereby the augmented user-specific data is used by the training means to generate the training data.

These and other objects, features and advantages of the present apparatus and method will become apparent from the following detailed description of illustrative embodiments, which is to be read in connection with the accompanying drawings.

DETAILED DESCRIPTION OF PREFERRED EMBODIMENTS

Figure 1:
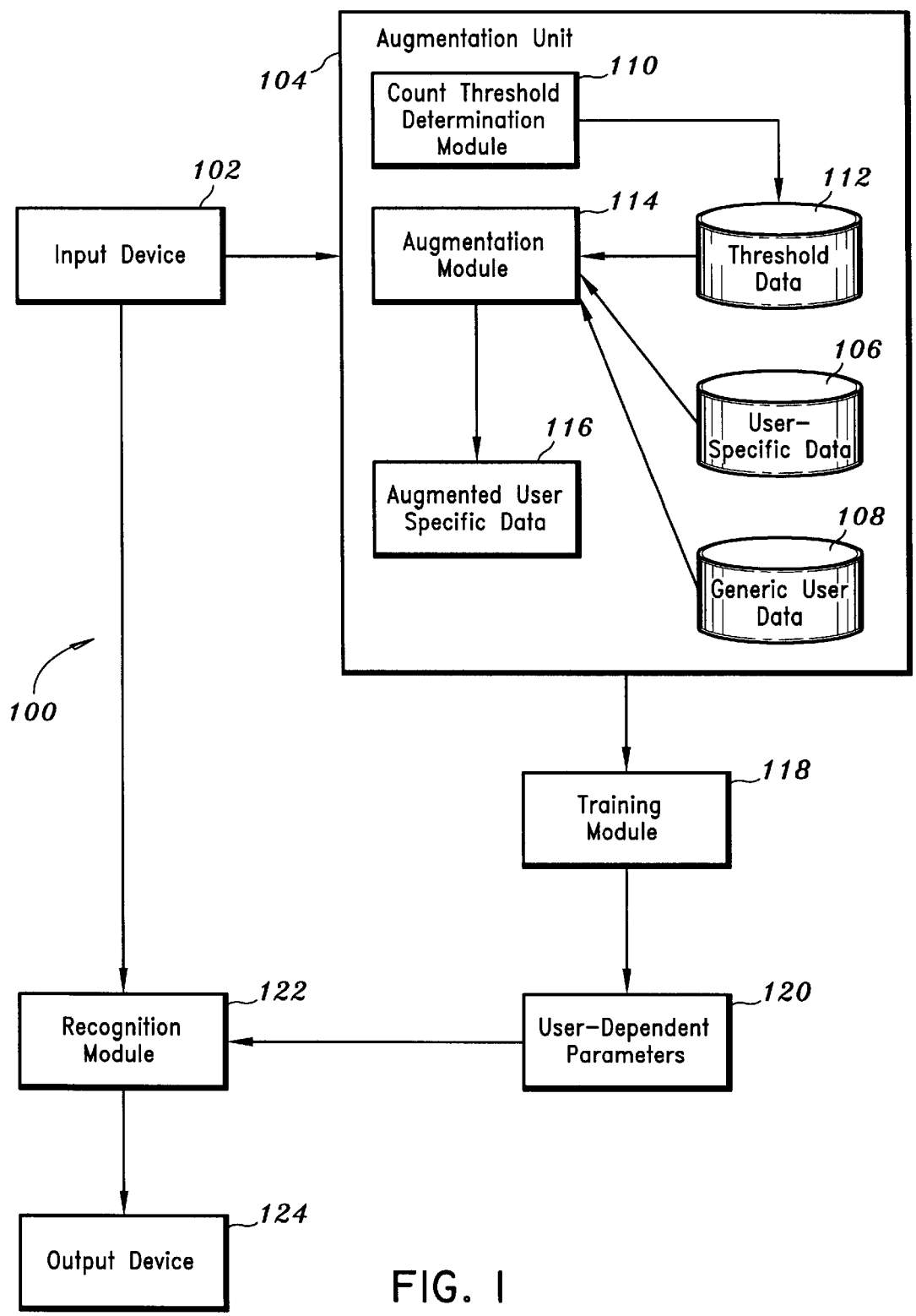
FIG. 1 is a block diagram of an embodiment of a data classification apparatus.

It is to be understood that the present apparatus and method described herein may be applied to other data classification (i.e., recognition) systems, notwithstanding that the illustrative embodiments are directed to a preferred embodiment of handwriting recognition. Accordingly, a data classification apparatus will be discussed with reference to FIG. 1, which illustrates a block diagram of a handwriting recognition apparatus in accordance with a preferred embodiment of the present invention. The apparatus 100 includes an input unit 102 for inputting data, e.g., handwritten text. The input unit can be any conventional device such as a digitizing tablet (i.e., pen-based computer) for real-time digitization and recognition of text which is directly written on the tablet, or a OCR scanner for inputting handwritten text. An augmentation unit 104 is operatively connected to the input device 102 for receiving user-specific data which is stored in a user-specific data store 106, as well as receiving generic user data which is stored in a generic user data store 108.

The generic user data is preferably obtained by collecting a representative set of handwriting samples from a random population of individuals. In particular, the collection of generic user data includes a plurality of handwriting samples for every character belonging to a given written language which is to be recognized, as well as punctuation characters and any special symbols (e.g. "$" and "&"). On the other hand, the user-specific data includes handwriting samples of characters which are collected from each individual in the population of individuals whose handwriting is to be recognized by the handwriting recognition apparatus 100. The handwritten samples (i.e., user-specific data and generic user data) may be stored in any suitable conventional format such as a bitmap image (which is typically generated with "off-line" OCR scanning) or as a sequence of X-Y coordinates which represent the location of a pen writing tip on the input device 102 at successive points in time (which is generated with an "on-line" pen-based computer).

The augmentation unit 104 also includes a count threshold determination module 110 which generates threshold data.

The threshold data is stored in threshold data store 112. As explained in further detail below, the threshold values represent, in general, a required quantity of user-specific data. An augmentation module 114 generates augmented user-specific data 116 by supplementing the user-specific data 106 with the generic user data 108 when the user-specific data is determined to be, e.g., deficient in accordance with corresponding threshold data 112 (i.e., the quantity of user-specific data falls below the corresponding threshold value). This augmentation method (i.e., supplementing the user-specific data) is described in further detail below with reference to FIG. 2.

The apparatus also includes a training module 118, operatively connected to the augmentation unit 104, which utilizes the augmented user-specific data 116 to train the apparatus 100 using any conventional training method, such as a training method suitable for handwriting recognition. The result of the training process is a set of user-dependant parameters 120 corresponding to the augmented user-specific data 116.

A recognition module 122, operatively connected to the input device 102, is utilized during a recognition process, whereby handwriting data of a given individual, for example, is input via the input device 102 and processed by the recognition module utilizing the user-dependant parameters 120 to recognize the handwriting of the individual. The recognition results are output via a output device 124 which can be a computer display, for example.

It is to be understood that the present data classification apparatus and augmentation method described herein may be implemented in various forms of hardware, software, firmware, or a combination thereof. In particular, the count threshold determination module 110, the augmentation module 114, the training module and the recognition module are preferably implemented in software and may include any suitable and preferred processor architecture by programming one or more general purpose processors. It is to be further understood that, because some of the components of the apparatus described herein are preferably implemented as software modules, the actual connections shown in FIG. 1 may differ depending upon the manner in which the apparatus is programmed. Of course, special purpose processors may be employed to implement the apparatus. Given the teachings herein, one of ordinary skill in the related art will be able to contemplate these and similar implementations or configurations of the present apparatus and method.

Preferably, the apparatus 100 of FIG. 1 is implemented on a computer platform including hardware such as one or more central processing units (CPU), a random access memory (RAM), and input/output (I/O) interface(s). The computer platform also includes an operating system and microinstruction code. The various processes and functions described herein such as augmentation, training and recognition may be either part of the microinstruction code or application programs which are executed via the operating system. In addition, various other peripheral devices may be connected to the computer platform such as an additional data storage device and a printing device.

A method for augmenting data to enhance the accuracy of the data classification apparatus 100 will now be discussed with reference to the flow diagram of FIG. 2. In particular, a method for augmenting handwriting sample data will be illustrated in accordance with the preferred handwriting recognition process. In the following description, the term "handwritten character class" (or "character class") refers to each character of a plurality of available written characters of a given language. For instance, as demonstrated with reference to a conventional computer keyboard, the written English language consists of approximately 94 different character classes: 42 alphabetic characters (upper case and lower case), 10 numeric characters (i.e., 0–9), and 32 punctuation character and special symbols such as exclamation ! and asterisk *, respectively. It is understood that other languages may have more or less available written character classes.

The term "collection of handwritten character class samples" refers to a set of handwritten instantiations that are included in a given character class. The collection of samples for each character class represents various writing styles for the corresponding character. The term "character subclass" refers to one of a plurality of different ways in which a given character class may be written. For example, the character class corresponding to the number "0" may contain two subclasses: one subclass having the character "0" with a diagonal line through the center and another subclass having the character "0" without the diagonal line. In addition, each character class for a given letter may be divided, e.g., into two subclasses: one representing a printed version of the letter and another representing a script version of the letter. It is to be understood that each subclass of a given character class may be further divided into sub-subclasses and that all subclasses and corresponding sub-subclasses are considered subclasses of the corresponding character class (i.e., no hierarchical structure).

Figure 2:
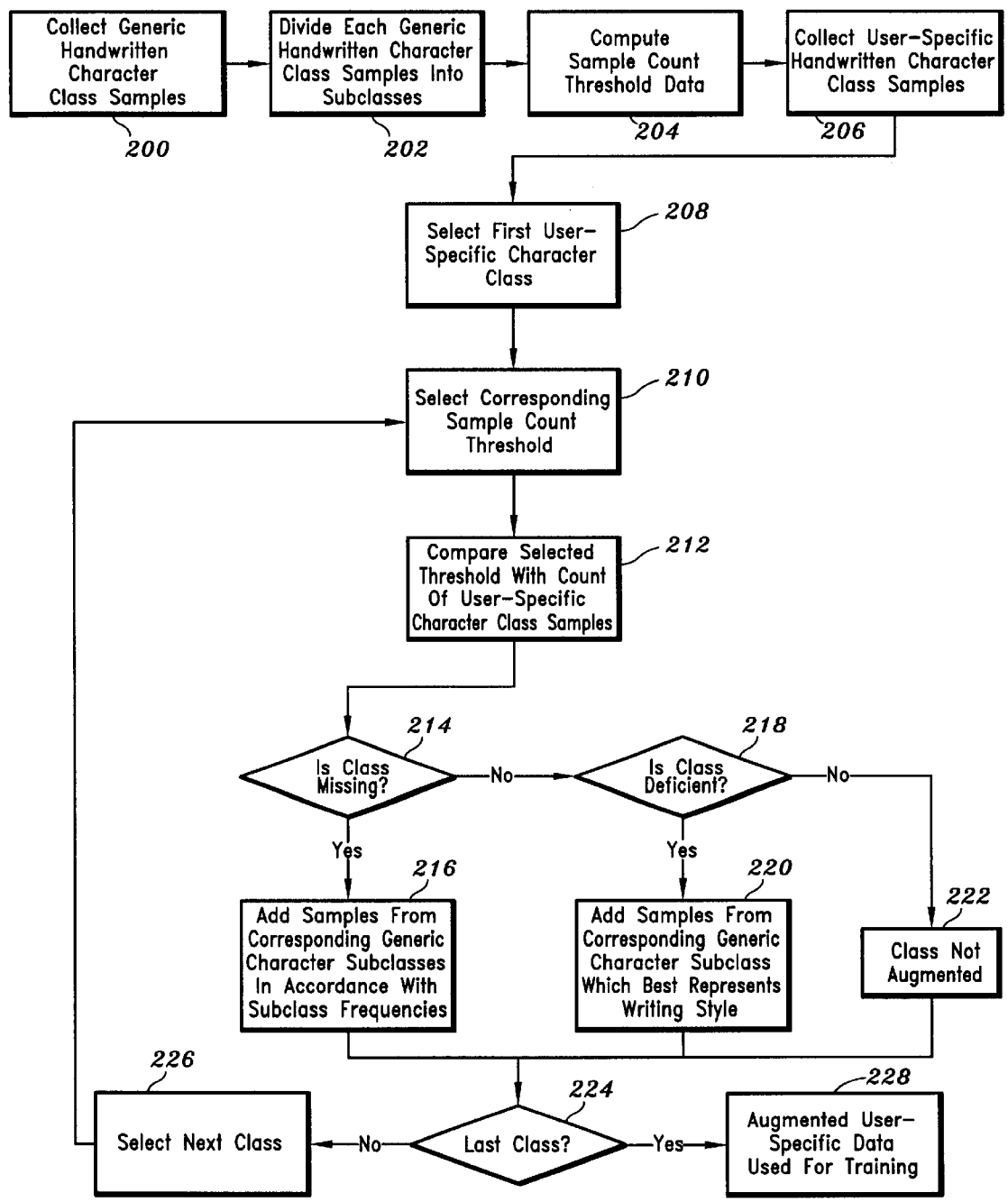
FIG. 2 is a flow diagram of a method for augmenting user-specific data in accordance with one aspect of the present invention.

Referring now to FIG. 2, initially, a generic collection of handwritten character class samples is inputted into the apparatus 100 via the input device 102 (FIG. 1), and stored (in binary form) with its corresponding correct text recognition in the generic user data store 108 (step 200). As stated above, the generic collection of character class samples includes a plurality of samples representing every written character belonging to the given language.

Next, each generic character class is divided into subclasses (step 202). In particular, the plurality of collected samples for each character class are divided into subclasses, with each subclass representing a different way of writing the character. For example, as indicated above, each character class for a given letter may be divided into two subclasses: one representing a printed version of the letter and another representing a script version of the letter.

It is to be understood that the subclasses may be generated using any conventional clustering method such as the preferred K-Means clustering method disclosed in the article by E. Bellegarda et al., entitled: "Fully Automatic Corpus Annotation Handwriting Recognition", IBM Technical Disclosure Bulletin, Vol. 36 #12, December, 1993. Alternatively, the K-means clustering method disclosed in "Pattern Classification and Scene Analysis" by R.O. Duda et al., Wiley, New York, 1973, may also be used. As is understood by those skilled in the art, the K-means clustering method divides a set of points into K-subsets which focus on minimizing the distance between the members of each subset and the mean of the subset. It is to be further understood, however, that a given character class will not be divided into subclasses if all the collected generic handwriting samples (i.e., data) for the character class are similar. (i.e., no subclasses will be generated if the clustering process does not meet a preselected threshold (or "metric")).

Next, sample count thresholds are computed from the generic data (step 204) preferably for each generic character class and stored in the threshold data store 112 (FIG. 1). As explained in further detail below, the sample count threshold values are used to determine which user-specific character classes need to be augmented. In particular, any user-specific character class having a sample count which is less than the computed sample count threshold for that character class, i.e., a "deficient class", is augmented. Each "deficient" class will have at least 1 character sample. Character classes having no collected character samples, i.e., "missing" classes, are also augmented.

Next, a user-specific set of handwriting character class samples (i.e., user-specific data) is collected from an individual writer (step 206). Preferably, the user-specific set of character class samples includes samples from as many existing character classes as is feasible. In addition, each character class in the set preferably contains as many samples as is feasible. The user-specific data is preferably collected from handwritten sentences which are input via the input device 102 and stored in the user-specific data store 106 (FIG. 1). As stated above, the sample count threshold data is used to determine if any of the user-specific character classes are deficient or missing.

The sample count threshold values are determined (in step 204) using any conventional cross-validation parameter selection technique such as the preferred method disclosed in "Cross-Validatory Choice And Assessment Of Statistical Predictions" by M. Stone, Journal of the Royal Statistical Society, Series B, Vol. 36, pp. 111–147, 1974. In general, cross-validation parameter estimation methods partition the data used for estimation (i.e., generic user data) into two sets which are then used in such a way as to reduce the bias of the parameters estimated and thereby improve the estimate. These methods are particularly valuable in situations with limited data set sizes. These methods result in optimizing the recognition accuracy of the data classification apparatus 100.

Preferably, with the present augmentation method, a sample count threshold value is computed for each of the character classes. In addition, a separate set of sample count thresholds may even be computed for character classes for each user. It is to be understood, however, that a single sample count threshold value may be computed and applied to every character class. In particular, when insufficient generic user data is collected, a single threshold value is computed using the cross-validation method. On the other hand, when sufficient generic user data is collected, the cross-validation method may be used to compute a sample count threshold for each character class. Whether or not there is "sufficient" generic user data is a determination that is generally done on a trial and error basis and can be made via the conventional cross-validation method discussed above.

It is to be appreciated that not every collected generic handwriting sample is stored in a subclass of the corresponding character class. The number of representative samples which are ultimately stored (and subsequently used for augmentation as discussed below) is essentially based on the sample count threshold which is computed for the given character class. For example, assuming that two thousand (2000) generic user samples were collected for the character class "A," if the sample count threshold for the character class "A" is determined to be 25, then only 25 samples (at a minimum) will be stored for each of the subclasses (if more than one) of the character class "A." The reason is that it is unnecessary to store such a large amount of data when only a certain amount of data is required to sufficiently augment a deficient user-specific character class "A". It is to be understood, however, that the set of generic samples that are stored for each subclass (or each character class) are representative of the spectrum of various writing styles that exist in the set of generic samples which are collected in step 200.

In addition, notwithstanding that the quantity of representative samples stored in each subclass of a corresponding generic character class is less than the quantity of the originally collected samples, each subclass is labelled to indicate the frequency at which the corresponding samples occurred in the generic samples collected (in step 200). For example, assume that the generic character class "A" contains a subclass for a printed "A" and a script "A", with each subclass having 25 representative samples. Assume further that, initially, 2000 samples of the generic character class "A" were collected and, after the subclass division process (step 202), a subclass for printed "A" contains 1500 generic samples and a subclass for script "A" contains 500 of the 2000 samples originally collected. The subclass printed "A" will be labelled with, e.g., 0.75 to indicate that 75% of the collected generic character class samples were printed "A", and the subclass script "A" will be labelled with, e.g., 0.25, to indicate that 25% of such samples were script "A". As explained in below, this "frequency" information will be utilized when augmenting user-specific character classes that are found to be "missing".

Referring again to FIG. 2, once the user-specific data is collected, the process of augmenting the user-specific data begins by choosing the first user-specific character class (step 208). In particular, the augmentation module 114 will retrieve from the user-specific data store 106 the data corresponding to the first character class. It is to be understood that the order in which the available character classes of a given language are processed is preselected and not important for implementing the present method.

Next, the augmentation module 114 retrieves the sample count threshold (from the threshold data store 112) which corresponds to the selected character class (step 210). As stated above, the sample count threshold may be either a particular value associated with the given character class or a value which is used for all character classes. In either scenario, the sample count threshold value is compared with number of handwriting samples (i.e, count) that were collected for the given user-specific character class (step 212).

A determination is then made as to whether the given character class is missing (step 214). As stated above, the given character class will be deemed missing if the count of user-specific character class samples is equal to 0 (i.e., there were no samples collected for the given user-specific character class). If the user-specific character class is deemed missing (affirmative result in step 214), the missing character class is augmented, preferably, by adding samples from each subclass in proportion to the frequencies of the subclasses for the corresponding generic character class. Specifically, the total number of samples added to a missing user-specific character class is equal to the sample count threshold value. By way of example, assume that the user-specific character class "A" is deemed missing and that the corresponding count threshold is 20. Using the frequency labels of 0.75 for subclass printed "A" and 0.25 for subclass script "A" as discussed above, the missing user-specific character class "A" will be augmented by adding 15 random samples from the generic subclass printed "A" and 5 random samples from the generic subclass script "A".

It is to be appreciated that, by adding samples proportional to the most frequently occurring subclasses, the recognition accuracy of the system is most likely to be increased. It is to be appreciated that, alternatively, a missing class may be augmented by adding samples only from the most frequently occurring subclass.

Referring again to FIG. 2, if it is determined that the selected user-specific character class is not missing (negative result in step 214), a determination is made as to whether the class is deficient (step 218). As indicated above, a given character class will deemed deficient if the sample count of the user-specific character class falls below the corresponding sample count threshold. If the user-specific character class is deemed deficient (affirmative result in step 218), the character class is augmented by adding samples from a subclass of the corresponding generic character class which best matches the writing style of the user (step 216). In particular, the number of samples which are added to the user-specific character class is equal to the difference between the sample count threshold and the number of samples in the given user-specific character class. It is to be appreciated that the closest matching generic character subclass is preferably selected using the K-means clustering techniques (or any conventional clustering method) described above.

On the other hand, if the given user-specific character class is found to be neither missing nor deficient, the character class will not be augmented (step 222). Once a given character class is either augmented (step 216 or 220) or not augmented (step 222), a determination is made as to whether the given character class is the last of the available character classes (step 224). If not (negative result in step 224), the next character class is selected (in the preselected order discussed above) (step 226). The sample count threshold for the newly selected character class is then obtained (step 210) and the augmentation process is repeated until every user-specific character class has been processed. After the last character class has been processed in accordance with the present augmentation method (affirmative result in step 224), the augmented user-specific character classes are provided to the training module 118 (FIG. 1) for training the recognition apparatus 100 in a manner understood by those skilled in the art.

Although the illustrative embodiments have been described herein with reference to the accompanying drawings, it is to be understood that the present apparatus and method is not limited to those precise embodiments, and that various other changes and modifications may be affected therein by one skilled in the art without departing from the scope or spirit of the invention. It is to be appreciated by those of ordinary skill in the art that, as indicated above, the present augmentation method described herein is not limited to handwritten character recognition and can be applied to other machine recognition procedures. For instance, the problems associated with deficient or missing classes is encountered in speech recognition systems. In speech recognition, the character classes described herein are analogized to phoneme classes (which typically only have a single subclass). Accordingly, user-specific phoneme classes may be augmented by corresponding generic user phoneme classes in a similar manner described herein. All such changes and modifications are intended to be included within the scope of the invention as defined by the appended claims.

What is claimed is:

1. A method for generating training data for a recognition system, comprising the steps of:

establishing a plurality of data classes;

collecting samples of user-generic data for each of the data classes;

dividing the samples of user-generic data of a data class into one or more data subclasses, wherein each data subclass represents a different form of the data class;

collecting samples of user-specific data and associating the samples of user-specific data with corresponding ones of the data classes; and augmenting user-specific data for a given data class if necessary, with samples of user-generic data associated with the given data class and corresponding data subclasses, wherein the augmented user-specific data comprises training data for the recognition system.

2. The method of claim 1, wherein the plurality of data classes comprise character classes, wherein each character class represents a character of a given written language. and wherein the recognition system comprises an automatic handwriting recognition system.

3. The method of claim 2, wherein the data subclasses of a character class comprise a data subclass representing a script version of the character and a data subclass representing a printed version of the character.

4. The method of claim 1, wherein the plurality of data classes comprise phoneme classes, wherein each phoneme class represents a phoneme of a given spoken language, and wherein the recognition system comprises an automatic speech recognition system.

5. The method of claim 1, further comprising the step of computing threshold data based on a count of the collected samples of user-generic data for the plurality of data classes, wherein the threshold data comprises at least one sample count threshold value, and wherein the step of augmenting user-specific data for a given data class is based on a comparison between an amount of samples of user-specific data associated with the given data class and threshold data associated with the given data class.

6. The method of claim 5, wherein the step of computing threshold data comprises the steps of:

for each data class computing a sample count threshold value based on a number of samples of user-generic data associated with the data class; and storing the sample count threshold values.

7. The method of claim 5, wherein the step of computing threshold data comprises the steps of:

computing a sample count threshold value that is applied to all of the data classes; and storing the sample count threshold value.

8. The method of claim 5, wherein the step of augmenting comprises the steps of:

selecting a data class and retrieving the sample count threshold value corresponding to the selected data class;

comparing the corresponding sample count threshold value with a number of samples of user-specific data associated with the selected data class; and adding samples of user-generic data associated with the selected data class to the user-specific data for the selected data class if the number of samples of user-specific data for the selected data class falls below the corresponding sample count threshold value.

9. The method of claim 8, wherein a number of added samples of user-generic data is equal to the difference between the corresponding sample count threshold value and the number of samples of user-specific data for the selected data class.

10. The method of claim 9, wherein a number of added samples of user-generic data is equal to the corresponding sample count threshold value.

11. The method of claim 8, wherein the step of adding comprises the steps of:
   determining if samples of user-specific data were collected for the selected data class;
   identifying a data subclass of the selected data class that comprises user-generic data which is most similar to the user-specific data of the selected data class, if samples of user-specific data Were collected for the selected data class; and
   selecting samples of user-generic data associated with the identified data subclass.

12. The method of claim 11, further comprising the step of computing frequency values for data subclasses of each data class wherein the frequency value of a given data subclass represents a ratio of a number of collected samples of user-generic data for the given data subclass to a total number of collected samples of user-generic for the corresponding data class, wherein the step of adding further comprises the step of selecting samples of user-generic data associated with the selected data class based on frequency values of the subclasses of the selected data class if samples of user-specific data were not collected for the selected data class.

13. The method of claim 12, wherein the step of selecting samples of user-generic data based on subclass frequency values comprises selecting samples of user-generic data from a data subclass of the selected data class having a greatest frequency value corresponding thereto.

14. The method of claim 12, wherein the step of selecting samples of user-gencric data based on frequency values comprises selecting samples of user-generic data from each of the data subclasses of the selected character class in proportion to the frequency values of the data subclasses.

15. A program storage device readable by a machine, tangibly embodying a program of instructions executable by the machine to perform method steps for generating training data for a recognition system the method steps comprising:
   establishing a plurality of data classes;
   collecting samples of user-generic data for each of the data classes;
   dividing the samples of user-generic data of a data class into one or more data subclasses, wherein each data subclass represents a different form of the data class;
   collecting samples of user-specific data and associating the samples of user-specific data with corresponding ones of the data classes; and
   augmenting user-specific data for a given data class, if necessary, with samples of user-generic data associated with the given data class and corresponding data subclasses, wherein the augmented user-specific data comprises training data for the recognition system.

16. The program storage device of claim 15, further comprising instructions for the step of computing threshold data based on a count of the collected samples of user-generic data for the plurality of data classes wherein the threshold data comprises at least one sample count threshold value and wherein the step of augmenting user-specific data from a given data class is based on a comparison between an amount of samples of user-specific data associated with the given data class and threshold data associated with the given data class.

17. The program storage device of claim 16, wherein the instructions for the step of computing threshold data comprise instructions for the steps of:
   for each data class, computing a sample count threshold value based on a number of samples of user-generic data associated with the data class; and
   storing the sample count threshold values.

18. The program storage device of claim 16, wherein the instructions for the step of computing threshold data comprise instructions for the steps of:
   computing a sample count threshold value that is applied to all of the data classes; and
   storing the sample Count threshold value.

19. The program storage device of claim 16, wherein the instructions for the step of augmenting comprise instructions for the steps of:
   selecting a data class and retrieving the sample count threshold value corresponding to the selected data class;
   comparing the corresponding sample count threshold value with a number of samples of user-specific data associated with the selected data class; and
   adding samples of user-generic data associated with the selected data class to the user-specific data for the selected data class, if the number of samples of user-specific data for the selected data class falls below the corresponding sample count threshold value.

20. The program storage device of claim 19, wherein a number of added samples of user-generic data is equal to the difference between the corresponding sample count threshold value and the number of samples of user-specific data for the selected data class.

21. The program storage device of claim 19, wherein a number of added samples of user-generic data is equal to the corresponding sample count threshold value.

22. The program storage device of claim 19, wherein the instructions for the step of adding comprise instructions for the steps of:
   determining if samples of user-specific data were collected for the selected data class;
   identifying a data subclass of the selected data class that comprises user-generic data which is most similar to the user-specific data of the selected data class, it samples of user-specific data where collected for the selected data class; and
   selecting samples of user-generic data associated with the identified data subclass.

23. The program storage device of claim 22, further comprising instructions for the step of computing frequency values for data subclasses of each data class wherein the frequency value of a given data subclass represents a ratio of a number of collected samples of user-generic data for the given data subclass to a total number of collected samples of user-generic for the corresponding data classwherein the instructions for the step of adding further comprise instructions for the step of selecting samples of user-generic data associated with the selected data class based on frequency values of the subclasses of the selected data class if samples of user-specific data here not collected for the selected data class.

24. The program storage device of claim 23, wherein the instructions for the step of selecting samples of user-generic data based on subclass frequency values comprise instructions for the step of selecting samples of user-generic data from a data subclass of the selected data class having a greatest frequency value corresponding thereto.

25. The program storage device of claim 23, wherein the instructions for the step of selecting samples of user-generic data based on frequency values comprise instructions for the step of selecting samples of user-generic data from each of the data subclasses of the selected character class in proportion to the frequency values of the data subclasses.

26. A data recognition apparatus, comprising:

an input device for collecting samples of user-generic data and samples of user-specific data;

a storage medium for storing the samples of user-generic data and user-specific wherein the stored samples of user-generic data are assigned into a plurality of data classes, wherein the samples of user-generic data of a data class are further divided into one or more data subclasses each representing a different form of the data class, and wherein the samples user-specific data are associated with corresponding ones of the data classes:

an augmentation unit adapted to augment user-specific data for a given data class, if necessary, with samples of user-generic data associated with the given data class and corresponding data subclasses; and a training unit adapted to train the data recognition system using the augmented user-specific data.

* * * * *